United States Patent
Havewala et al.

(10) Patent No.: US 8,607,099 B2
(45) Date of Patent: Dec. 10, 2013

(54) ONLINE FAULT VERIFICATION IN A FILE SYSTEM

(75) Inventors: Sarosh C. Havewala, Kirkland, WA (US); Neal R. Christiansen, Bellevue, WA (US); John D. Slingwine, Duvall, WA (US); Craig A. Barkhouse, Redmond, WA (US); Daniel Chan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/970,948

(22) Filed: Dec. 17, 2010

(65) Prior Publication Data

US 2012/0159255 A1 Jun. 21, 2012

(51) Int. Cl.
*G06F 11/00* (2006.01)

(52) U.S. Cl.
USPC ............ 714/42; 714/6.1; 714/6.11; 714/6.31; 714/21; 714/25; 714/40; 714/54

(58) Field of Classification Search
USPC .......... 714/6.1, 6.11, 6.31, 21, 25, 40, 42, 54
See application file for complete search history.

(56) References Cited

U.S. PATENT DOCUMENTS

| | | | |
|---|---|---|---|
| 5,870,762 A | 2/1999 | Lee | |
| 6,718,446 B1 * | 4/2004 | Peters et al. | 711/162 |
| 7,293,044 B2 * | 11/2007 | Ghotge et al. | 1/1 |
| 7,506,213 B1 * | 3/2009 | Cabrera et al. | 714/42 |
| 7,526,686 B2 | 4/2009 | Kolvick et al. | |
| 7,653,647 B2 * | 1/2010 | Borthakur et al. | 707/687 |
| 7,756,834 B2 * | 7/2010 | Masters et al. | 707/640 |
| 7,827,440 B1 * | 11/2010 | Dudte et al. | 714/6.12 |
| 7,930,491 B1 * | 4/2011 | Xu et al. | 711/154 |
| 8,171,000 B2 * | 5/2012 | Seeger et al. | 707/691 |
| 2002/0169998 A1 | 11/2002 | Largman et al. | |
| 2004/0054989 A1 * | 3/2004 | Harres | 717/124 |
| 2005/0228832 A1 * | 10/2005 | Ghotge et al. | 707/200 |
| 2005/0246612 A1 * | 11/2005 | Leis et al. | 714/763 |
| 2007/0100905 A1 * | 5/2007 | Masters et al. | 707/201 |
| 2009/0106327 A1 | 4/2009 | Dilman et al. | |

OTHER PUBLICATIONS

"Troubleshooting Disks and File Systems", Retrieved at << http://technet.microsoft.com/en-us/library/bb457122%28printer%29.aspx >>, Nov. 3, 2005, pp. 48.
Wilson, Michael, "Fight crime. Unravel incidents . . . one byte at a time", Retrieved at << http://computer-forensics.sans.org/community/papers/rootkit_128 >>, Oct. 5, 2004, pp. 106.
Demsky, et al., "Automatic Data Structure Repair for Self-Healing Systems", Retrieved at << http://people.csail.mit.edu/rinard/paper/sms03.pdf >>, 2001, pp. 6.
Kustarz, Eric, "ZFS the last Word in File Systems", Retrieved at << http://www.cse.iitk.ac.in/users/sunclub/sunfiles/zfs_last.pdf >>, pp. 36.

* cited by examiner

*Primary Examiner* — Joshua P Lottich

(57) ABSTRACT

Data structure errors, or corruptions, identified during, e.g., normal computing device system processing, file system processing or user access processing, are verified prior to the file system identifying the error for offline correction or notifying the user or system administrator a data structure error exists. Identified data structure corruptions are verified while the file system volumes are maintained online and otherwise accessible to other processing tasks and user access. Verified data structure corruptions are logged for further corrective processing. Data structure corruptions that cannot be verified, i.e., false positives, are not further processed and are not identified to file system administrators or users as corruptions, freeing the file system to concentrate on normal processing and true, verifiable errors.

20 Claims, 6 Drawing Sheets

ONLINE FAULT VERIFICATION IN A FILE SYSTEM

CROSS-REFERENCE TO RELATED APPLICATIONS

This application is related to commonly assigned, co-pending U.S. patent application Ser. No. 12/970,985, entitled "File System Resiliency Management", and commonly assigned, co-pending U.S. patent application Ser. No. 12/970,954 entitled "Proactive Error Scan And Isolated Error Correction", each of which is filed herewith and incorporated herein by reference in their entirety.

BACKGROUND

File systems utilize data structures, also referred to as the file system on-disk format, to maintain and organize data on non-volatile, i.e., persistent, storage, e.g., a volume, disk, hard drive, etc. File systems access and interpret these data structures to store and retrieve data for users and applications, or procedures or computer programs, e.g., when executing software instructions or computer code.

When the file system encounters an error, i.e., a corruption, while trying to access and/or interpret the data structures the file system notes that there is an error and flags the particular storage volume, also referred to herein as volume, as corrupt. Even if the file system attempts to isolate and correct a reported error online, i.e., a self-healing system, some number of encountered corruptions cannot be resolved unless the volume is taken offline. However, while the volume is being processed offline to correct for errors the data and information stored thereon in its data structures is unavailable to any user or other application. These offline periods can be relatively lengthy, further degrading system availability and user satisfaction.

Moreover, when a file system believes it has encountered a corruption while trying to access a volume's data structures, there may be no real existing data structure corruption. In these cases, the error can generally be attributed to other events, e.g., transient errors in the system's volatile memory, transient errors in the system's non-volatile storage, bugs in the file system, etc. However, with existing technology file systems cannot discern between real corruption instances requiring offline processing to remedy and false positive instances when a data structure error is perceived but does not in fact exist.

Thus, it is desirable to verify perceived corruptions prior to taking a volume offline in order to significantly reduce the amount of time any of the file system volumes are offline, and thus unavailable for user and other application access. It would also be desirable to limit the error instances reported to file system administrators and users to those involving verified, i.e., true or real, corruptions.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for the verification of prior identified volume corruptions on volumes in a file system to minimize processing efforts expended in attempting to remedy identified corruptions and to diminish volume unavailability.

In embodiments, read-only snapshots of volumes that have prior identified corruptions thereon are generated. In embodiments, the snapshots are then processed for corruption verification, while the corresponding volume remains online and accessible. In embodiments, and utilizing the volume snapshots, prior identified corruptions are either verified as true, existing corruptions that the file system can thereafter attempt to remedy, or are determined to be false positives. In an aspect of these embodiments false positives are prior identified corruptions that are not in fact volume corruptions that the file system will expend time and effort attempting to remedy.

In embodiments corruptions are categorized into one of a predefined, limited group of corruption categories. In aspects of these embodiments corruption categorization can be utilized for, e.g., file system processing analysis, corruption verification, as an aid in subsequent corruption correction, etc.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
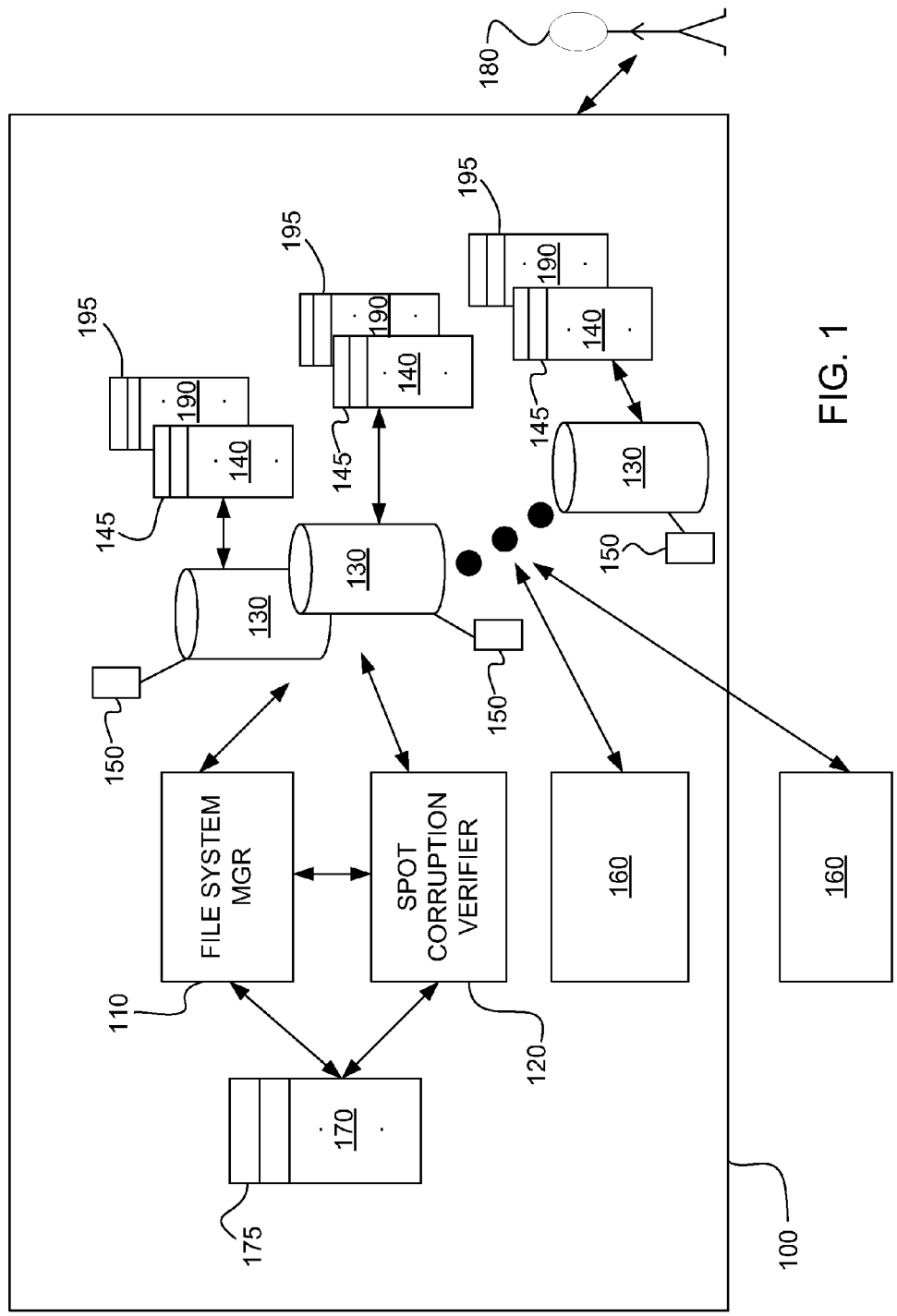
FIG. 1 depicts an embodiment file system with a spot corruption verifier component.

FIG. 1 depicts an embodiment file system 100 with a file system manager 110. In an embodiment the file system manager 110 is a software application task for managing the file system 100 to assist in ensuring proper processing and operation.

In an embodiment the file system 100 also has one or more volumes 130 that store data in data structures for use by processing applications, tasks, programs, routines, etc., collectively referred to as processing applications 160 herein, and users 180. In an embodiment one volume 130 is a system volume 130.

In embodiments processing applications 160 can be part of the file system 100 and/or separate from the file system 100.

In an embodiment, when the file system 100 encounters an unexpected condition while accessing a data structure on a volume 130, the unexpected condition, which becomes a flagged data structure error, is categorized, the data structure(s) involved are identified, and an entry identifying the flagged data structure error is generated in an error verification log 140 for the volume 130 as further discussed below.

An embodiment file system 100 includes a spot corruption verifier component 120. In an embodiment the spot corruption verifier 120 is a software application task that is executed by the file system 100 when one or more errors, or corruptions, have been flagged, or otherwise identified, on one or more volumes 130 of the file system. In an embodiment the spot corruption verifier 120 is initiated to process by the file system manager 110.

In an embodiment the spot corruption verifier 120 executes, or otherwise processes, while all file system volumes 130 remain online.

In an embodiment the spot corruption verifier 120 attempts to verify prior flagged, i.e., prior identified, data structure corruptions. In an aspect of this embodiment the spot corruption verifier 120 does not look for, or otherwise attempt to discover or verify, other possible corruptions that are not already identified when the spot corruption verifier 120 processes, i.e., runs.

In an embodiment the spot corruption verifier 120 has the capability to perform actions that are designed to verify, i.e., analyze, prior identified corruptions on the volumes 140 of the file system 100 to determine whether the prior identified corruptions do in fact exist.

In an embodiment the spot corruption verifier 120 notifies the file system 100 when it deems, or otherwise determines, a flagged corruption to be a false positive, i.e., when the spot corruption verifier 120 concludes that a prior identified data structure error does not in fact exist. In an aspect of this embodiment the spot corruption verifier 120 notifies the file system manager 110 when it deems a flagged corruption to be a false positive.

In an embodiment the spot corruption verifier 120 also notifies the file system 100 when it deems, or otherwise determines, a flagged corruption to be a true corruption, i.e., when the spot corruption verifier 120 concludes that a prior identified data structure error is a true, existing error. In an aspect of this embodiment the spot corruption verifier 120 notifies the file system manager 110 when it deems a flagged corruption to be a true corruption.

In an embodiment, when the spot corruption verifier 120 verifies a flagged data structure error, a corruption entry 195 is generated for the now verified, i.e., true, corruption in an error correction log 190 for the volume 130 as further discussed below.

In an embodiment the file system 100 notifies the file system administrator(s) 180 and/or file system user(s) 180, also collectively referred to herein as user 180, when it concludes that a prior flagged data structure error is a true, existing error. In an aspect of this embodiment the file system manager 110 notifies a user 180 when a prior identified data structure error is determined to be a true corruption. In an alternative aspect of this embodiment the spot corruption verifier 120 notifies a user 180 when a prior identified data structure error is determined to be a true corruption.

In an embodiment each volume 130 of a file system 100 has an associated error verification log 140, e.g., a $Verify file, also referred to as a volume verification log 140, where flagged, i.e., reported, data structure errors for the respective volume 130 are recorded, or otherwise indicated, via, e.g., verification entries 145 therein. In other embodiments flagged data structure errors, also referred to herein as volume errors, are reported by the use of other mechanisms, e.g., a single verification log 140 of verification entries 145 is utilized to report all volume errors for all volumes 130 of the file system 100, error tables are written to identify volume errors, etc.

In an embodiment a volume's verification log 140 is maintained on the respective volume 130. In an alternative embodiment volume verification logs 140 are maintained separate from their respective volumes 130.

In an embodiment each volume 130 of a file system 100 has an associated error correction log, e.g., $Corrupt file, 190, also referred to as a volume corruption log 190, volume corrupt log 190 or corrupt log 190, where verified data structure errors for the respective volume 130 are recorded, or otherwise indicated, via, e.g., corruption entries 195. In other embodiments verified data structure errors are reported by the use of other mechanisms, e.g., a single error correction log 190 of corruption entries 195 is utilized to report all verified volume errors for all volumes 130 of the file system 100, error tables are written to identify verified volume errors, etc.

In an embodiment a volume's error correction log 190 is maintained on the respective volume 130. In an alternative embodiment volume error correction logs 190 are maintained separate from their respective volumes 130.

In an embodiment each volume 130 has an associated dirty bit, or flag, 150 that, when set, indicates that the volume 130 has at least one verified, i.e., true, existing, corruption on it.

In an embodiment the file system 100 has an event log 170 where events, e.g., verified error corruptions, etc., are reported via, e.g., event log entries 175. In an embodiment event log entries 175 are utilized for communication between the spot corruption verifier 120 and the file system manager 110. In an embodiment event log entries 175 are utilized by the file system 100 to inform a user 180 of verified corruptions. In an embodiment event log entries 175 are utilized by the file system 100 for file system 100 analysis, maintenance, error detection and correction, etc. In embodiments event log entries 175 are used for additional, other, additional and/or other combinations of tasks.

Figure 2A:
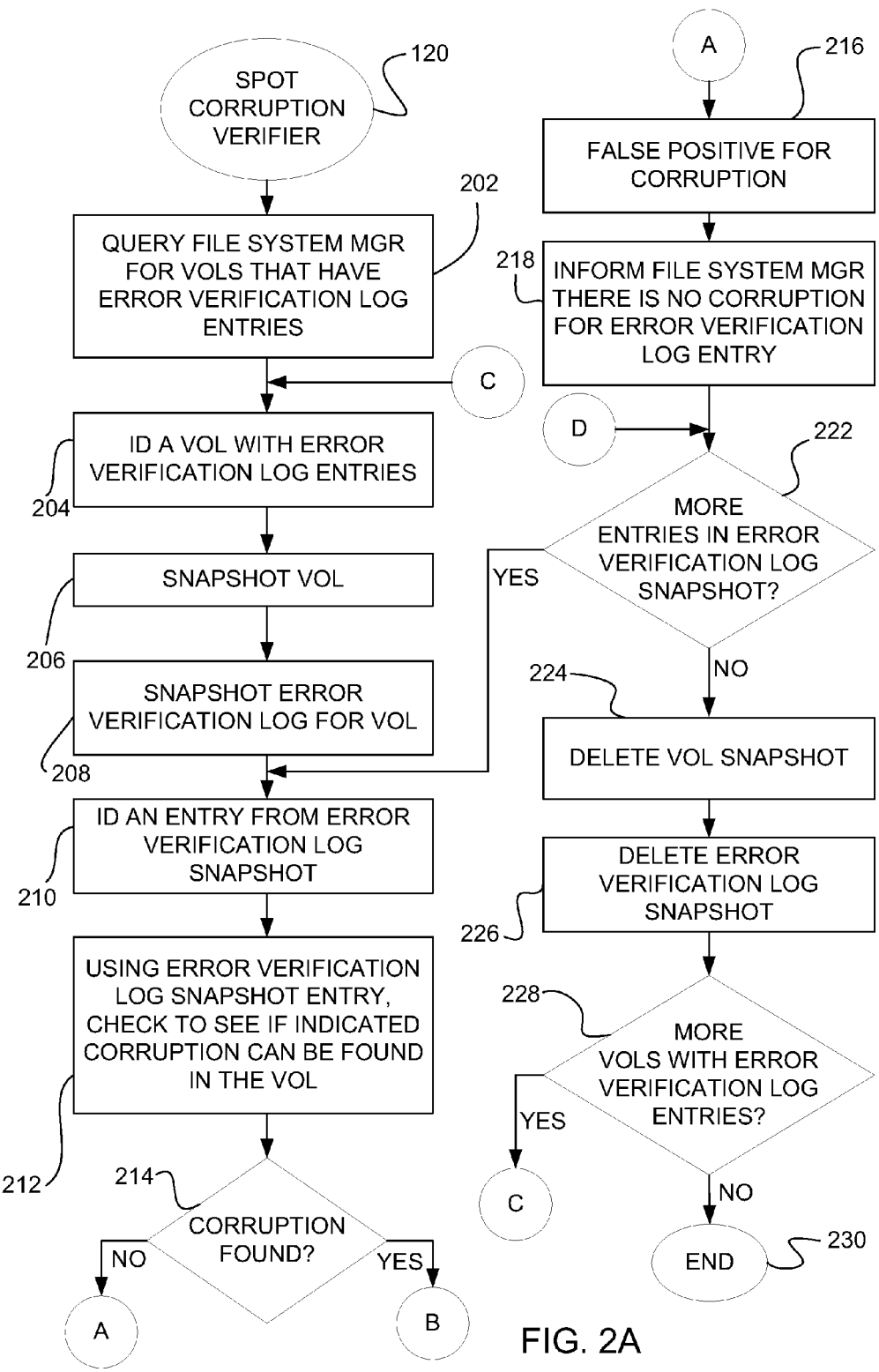
FIGS. 2A-2B illustrate an embodiment logic flow for online spot verification of identified corruptions in file system data structures.
Figure 2B:
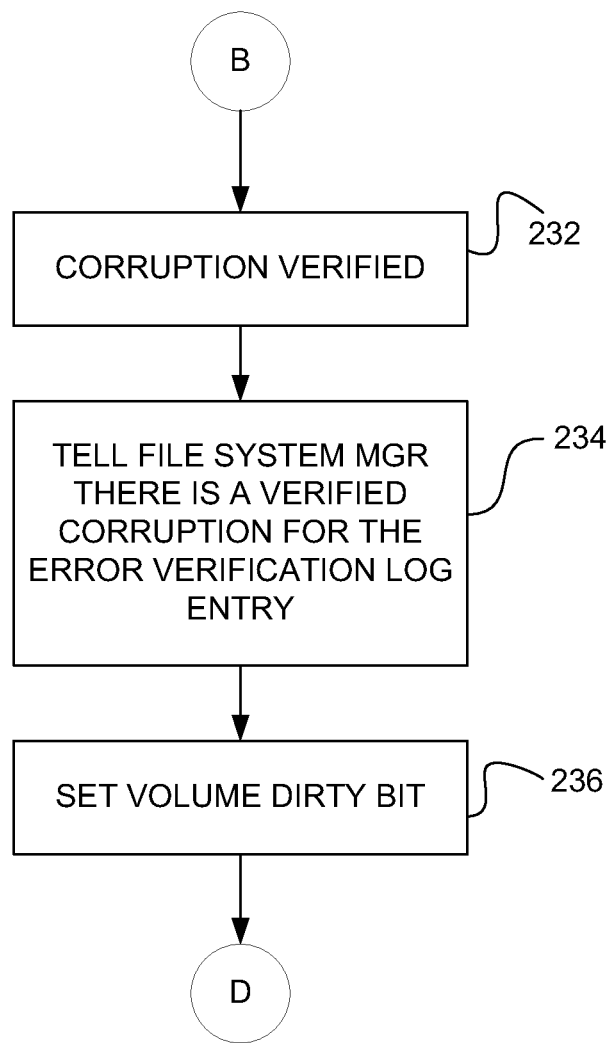

FIGS. 2A and 2B illustrate an embodiment logic flow for effectively and efficiently verifying volume errors while the respective volume 130 remains online and otherwise available. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment spot corruption verifier 120 or by an embodiment spot corruption verifier 120 in combination with one or more other system entities, components and/or applications, such as, but not limited to, a file system manager 110.

Referring to FIG. 2A in an embodiment a spot corruption verifier 120 queries the file system manager for an identification of the volumes on the system that have verification entries in their associated error verification log 202. In alternative embodiments the spot corruption verifier 120 identifies currently existing system volumes with flagged data structure errors via other mechanisms, e.g., by the use of tables, bit streams, etc., of volume flags identifying volumes with currently flagged data structure errors, etc.

In an embodiment the spot corruption verifier identifies a volume with verification entries in its associated error verification log 204. In an embodiment the spot corruption verifier takes, or otherwise generates, a snapshot of the identified volume 206. In an embodiment the snapshot of the identified volume includes a snapshot of the volume's error verification log, e.g., $Verify file, 206. In an alternative embodiment the spot corruption verifier takes, or otherwise generates, a snapshot of the error verification log, e.g., $Verify, for the identified volume 208. In this alternative embodiment the generation of the snapshot of the error verification log 140 is synchronized with the generation of the snapshot of the respective identified volume 130 in order that the snapshots of the volume 130 and its error verification log 140 are consistent.

In an embodiment the snapshot(s) of the identified volume 130 and the identified volume's error verification log 140 are read-only.

In an embodiment the spot corruption verifier identifies a verification entry in the snapshot version of the error verification log 210; i.e., identifies a verification entry for a flagged, i.e., prior identified, data structure corruption to be processed, or verified. In an embodiment and using the identified verification entry, the spot corruption verifier analyzes In an embodiment corruptions identified with a verification entry 145 in a volume's error verification log 140 have been categorized, as further discussed below. In an embodiment the corruption categorization is utilized by the spot corruption verifier 120 as the spot corruption verifier 120 attempts to verify the corruption for the current identified verification entry 145.

At decision block 214 a determination is made as to whether or not the data structure corruption identified in the current verification entry being processed is verified as a true data structure corruption. If no, the verification entry being processed identifies a false positive corruption 216; i.e., it identifies a data structure corruption that cannot be verified and therefore is deemed as not representing a true data structure corruption the file system will attempt to remedy. In an embodiment the spot corruption verifier informs the file system manager that there is no corruption for the currently processed verification entry 218. In embodiments various mechanisms are utilized to inform the file system manager of a false positive for a verification entry, e.g., a flag, a table entry, a message, an interrupt, etc.

In an embodiment at decision block 222 a determination is made as to whether or not there are any more verification entries to process in the snapshot of the current error verification log being processed. If yes, in an embodiment the spot corruption verifier identifies another verification entry in the snapshot error verification log currently being processed for a flagged data structure corruption to be verified 210.

If, however, at decision block 222 it is determined that there are no more verification entries to process in the snapshot of the error verification log currently being processed then in an embodiment the spot corruption verifier deletes the snapshot of the volume for which it is has currently been processing flagged data corruptions 224. In an embodiment the deletion of the snapshot of a volume also causes the deletion of the snapshot of the volume's error verification log that is maintained on the volume. In an alternative embodiment, where the volumes' error verification logs are maintained separately from their respective volumes, the spot corruption verifier deletes the snapshot of the error verification log that it has currently been processing 226.

In an embodiment at decision block 228 a determination is made as to whether there are any more volumes reported by the file system manager, or otherwise identified, as currently having verification entries in their associated error verification log. If yes, in an embodiment the spot corruption verifier identifies another volume of the file system with verification entries in its associated error verification log to now be processed 204.

If, however, at decision block 228 there are no more volumes currently reported by the file system manager, or otherwise identified, as having verification entries in their associated error verification logs then in an embodiment the spot corruption verifier processing ends 230.

Referring again to decision block 214, if the spot corruption verifier verifies a flagged data structure corruption with an associated verification entry in the snapshot of the error verification log currently being processed then in an embodiment, and referring to FIG. 2B, the reported volume corruption is verified as a true, existing corruption 232.

In an embodiment the spot corruption verifier informs the file system manager that there is a verified volume corruption for the currently processed error verification log entry 234. In embodiments various mechanisms are utilized to inform the file system manager of the verified volume corruption for the error verification log entry currently being processed, e.g., a flag; a table entry, a message; an interrupt; etc.

In an embodiment, upon being notified of a verified volume corruption by the spot corruption verifier 120, the file system manager 110 generates an event log entry 175 that identifies the verified, existing volume corruption, as further discussed below with reference to FIG. 3. In an alternative embodiment, the spot corruption verifier generates an event log entry that identifies the verified, existing volume corruption.

In an embodiment the event log 170 and its entries 175 can be accessed by a user 180 to determine what has occurred within the file system 100, e.g., to determine a verified volume corruption exists. In an alternative embodiment an event log entry 175 identifying a verified volume corruption is used by the file system manager 110 to report a message, e.g., via a pop-up text block on a computing device screen, to a user 180 that informs of the verified volume corruption.

In an embodiment an event log entry identifying a verified volume corruption provides an indication of the file system's determination of the severity of the verified volume corruption. In an embodiment a reported message that informs of the verified volume corruption provides an indication of the file system's determination of the severity of the verified volume corruption. As noted, the indicated severity of the verified volume corruption can be used by a user 180 to assist in determining when action to attempt to remedy the corruption can, or ought, to be commenced.

In an embodiment the spot corruption verifier sets a volume dirty bit, or volume flag, to indicate that the volume whose snapshot is currently being processed has at least one corruption 236. In an alternative embodiment the file system manager 110 of the file system 100 sets the appropriate volume dirty bit, or volume flag, 150 when it is informed by the spot corruption verifier 120 that the volume 130 has at least one corruption.

In an embodiment, and referring again to FIG. 2A, at decision block 222 a determination is made as to whether there are any more entries to process in the snapshot of the current error verification log being processed.

Figure 3:
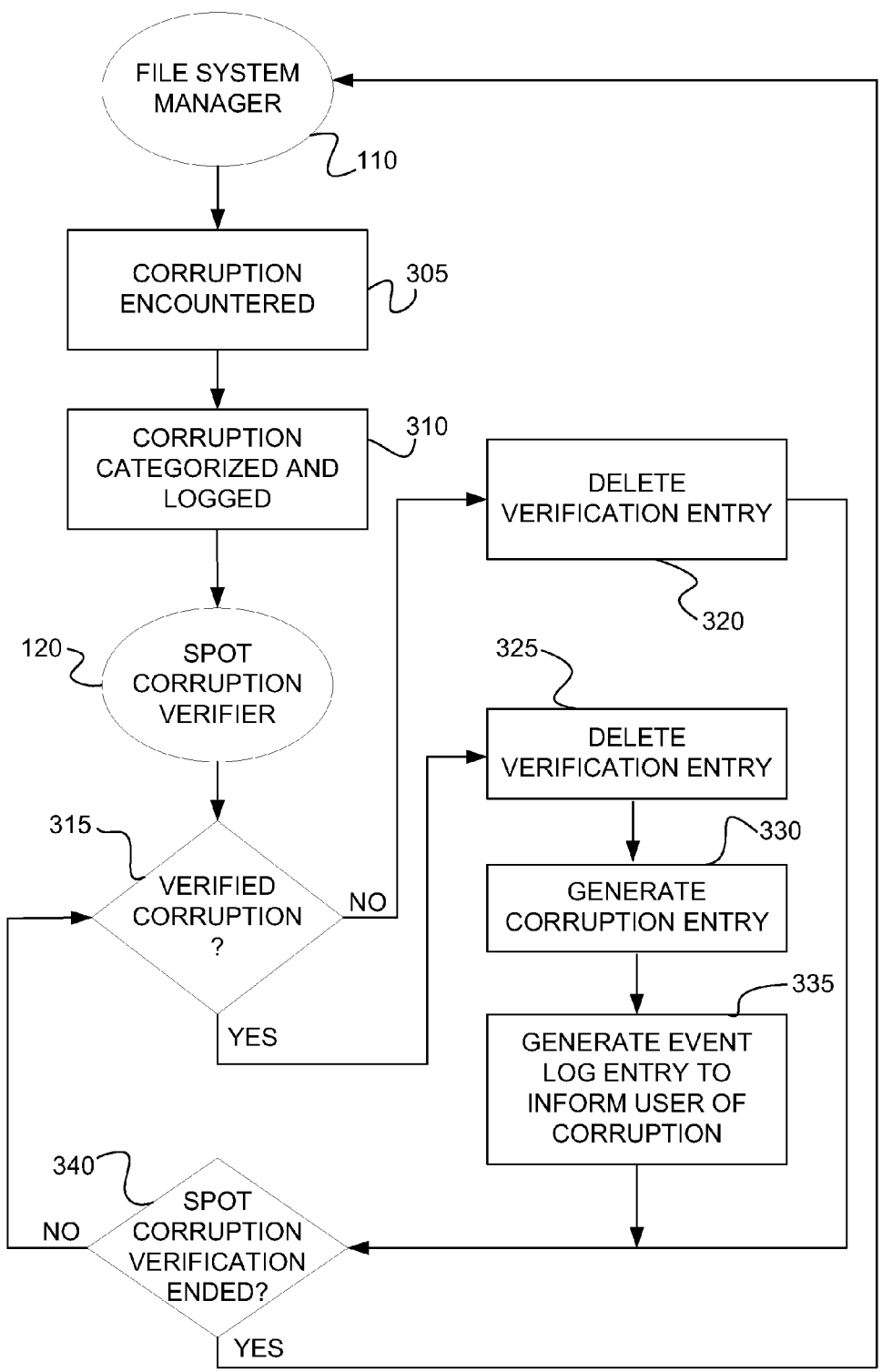
FIG. 3 illustrates an embodiment logic flow for file system manager processing in conjunction with online spot verification.

FIG. 3 illustrates an embodiment logic flow for a file system manager 110 to process in conjunction with spot corruption verification. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by an embodiment file system manager 110 or by an embodiment file system manager 110 in combination with one or more other system entities, components and/or applications.

In an embodiment the file system manager 110 is processing and, at some point, a corruption is encountered on a volume of the file system 305. In an embodiment the encountered corruption is categorized 310, as further discussed with reference to FIG. 4 below, and the corruption is logged 310, i.e., a verification entry 145 for the corruption is generated in the affected volume's error verification log 140. In an embodiment the file system manager 110 initiates, i.e., calls or activates, an embodiment spot corruption verifier 120 to process.

In an embodiment at decision block 315 the file system manager determines whether the spot corruption verifier has verified a prior identified corruption as a true, existing corruption, or whether the spot corruption verifier has determined the prior identified corruption is a false positive. If the spot corruption verifier has determined that a prior identified corruption is a false positive, then in an embodiment the file system manager deletes the appropriate verification entry identifying the false positive corruption from the volume's error verification log 320.

If the spot corruption verifier has determined that a prior identified corruption is a true, existing corruption, i.e., a verified corruption, then in an embodiment the file system manager deletes the appropriate verification entry identifying the verified corruption from the volume's error verification log 325 and generates a respective entry for the verified corruption in the volume's error correction log 330.

In an embodiment, upon being notified of a verified volume corruption by the spot corruption verifier, the file system manager generates an event log entry that identifies the verified, existing volume corruption 335. In an alternative embodiment, the spot corruption verifier 120 generates an event log entry 175 that identifies the verified, existing volume corruption.

In an embodiment the event log 170 and its entries 175 can be accessed by a user 180 to determine what has occurred within the file system 100, e.g., to determine a verified volume corruption exists. In an alternative embodiment an event log entry 175 identifying a verified volume corruption is used by the file system manager 110 to report a message, e.g., via a pop-up text block on a computing device screen, to a user 180 that informs of the verified volume corruption.

In an embodiment an event log entry 175 identifying a verified volume corruption provides an indication of the file system's determination of the severity of the verified volume corruption. In an embodiment a reported message that informs of the verified volume corruption provides an indication of the file system's determination of the severity of the verified volume corruption. As noted, the indicated severity of the verified volume corruption can be used by a user 180 to assist in determining when an attempt to remedy the corruption can, or ought, to be commenced.

In an embodiment at decision block 340 a determination is made as to whether current spot corruption verification processing has ended. If no, in an embodiment processing returns to decision block 315 where a determination is made as to whether the spot corruption verifier has verified a prior identified corruption as a true, existing corruption, or whether the spot corruption verifier has determined a prior identified corruption is a false positive.

If at decision block 340 current spot corruption verification processing has ended then in an embodiment the file system manager 110 continues processing.

Figure 4:
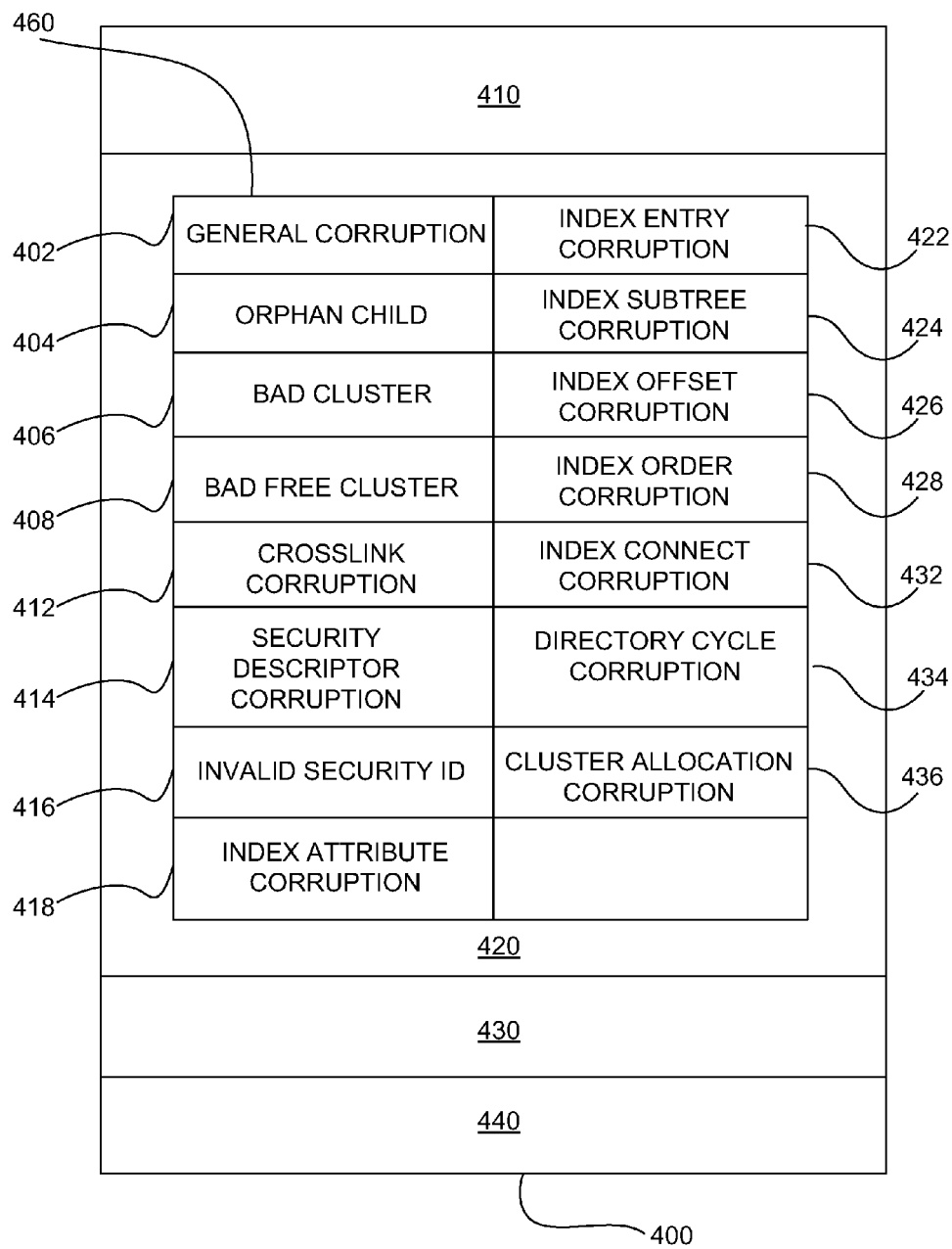
FIG. 4 depicts an exemplary error log entry.

As previously discussed, in an embodiment each volume 130 of a file system 100 has an associated error verification log 140 where flagged, i.e., reported, data structure errors for the respective volume 130 are recorded, or otherwise indicated, via, e.g., verification entries 145 therein. In an embodiment each volume 130 of a file system 100 also has an associated error correction log 190 where verified data structure errors for the respective volume 130 are recorded, or otherwise indicated, via, e.g., corruption entries 195. An embodiment verification entry and embodiment corruption entry 400, also referred to herein collectively as an error log entry 400, is depicted in FIG. 4.

In an embodiment each flagged data structure error is categorized at the time it is initially discovered and this categorization is included in a corruption type field 420 for an error log entry 400. Thus, in an embodiment, when the file system 100 encounters an unexpected condition while accessing a data structure on a volume 130, the unexpected condition, which becomes a flagged data structure error, is categorized, the data structure(s) involved are identified, and a verification entry 145 is generated in the proper volume's error verification log 140. Thereafter, in an embodiment, when the spot corruption verifier 120 verifies a flagged data structure error, a corruption entry 195 is generated for the now verified data structure error in the proper volume's error correction log 190. In an aspect of this embodiment, the generated corruption entry 195 is the corresponding verification entry 145 for the corruption that is now stored in the proper volume's error correction log 190.

In an embodiment an entry for the corruption type field 420 can be modified as necessary by the spot corruption verifier 120 when the spot corruption verifier 120 processes the volume corruption record 400 in the snapshot version of a volume's error verification log 140.

In an embodiment a set of categories 460 are identified to be utilized to categorize, or otherwise label, any particular volume corruption. In an embodiment there are a finite number of categories in the set of categories 460 to help promote efficient and meaningful processing thereof. For example, in an embodiment the category of a flagged data structure corruption is useful for generalizing and simplifying the verification processing of the respective data structure corruption. As another example, in an embodiment the category of a verified data structure corruption is useful for subsequent processing of any attempt to remedy the corruption.

In an embodiment the set of categories 460 includes a general corruption category 402. In an embodiment a general corruption category 402 indicates that some type of corruption was noticed and signifies that an inspection of the entire volume 130 for errors is warranted.

In an embodiment an orphan child category 404 is included in the set of categories 460. In an embodiment file system 100 a collection of one or more files is stored on each volume 130. In an embodiment each file stored on a volume 130 has one or more records and each record consists of one or more segments. In an embodiment each segment consists of one or more fields that each contain data. In an embodiment a file record segment is the smallest element that can be retrieved from a volume 130. In an embodiment each file record consists of a root, or base, parent, etc., segment. In an embodiment each file record can also contain one or more dependent, i.e., child segments. In an embodiment an orphan child category 404 indicates that an in-use child file record segment was located, i.e., there is an existing dependent file record segment that is in use and contains viable data, but that its base, or root, file record segment is either not in use or does not list the child file record as a child.

In an embodiment a bad cluster category 406 is included in the set of categories 460. In embodiment file systems 100 a cluster is the unit of disk space allocation for volume files. To reduce overhead in the management of file system volumes 130, an embodiment file system 100 does not allocate individual disk sectors, but rather, contiguous groups of sectors, called clusters. In an embodiment a cluster is the smallest logical amount of disk space that can be allocated for a file on a volume 130. In an embodiment a bad cluster category 406 indicates that a faulty sector was identified while accessing a cluster of non-resident stream data.

In an embodiment stream data is user data. In an embodiment stream data is stored directly in a file record. In an embodiment non-resident stream data is that user data that is stored in their own clusters rather than directly in a file record. In an embodiment a bad cluster category 406 indicates that it is a user data cluster, where non-resident stream data is stored, that has a corruption.

In an embodiment a bad free cluster category 408 is included in the set of categories 460. In an embodiment a bad free cluster category 408 indicates that a faulty cluster was noticed during the access of a free, i.e., as yet, unused, cluster on the volume 130.

In an embodiment a crosslink corruption category 412 is included in the set of categories 460. In an embodiment a crosslink corruption category 412 indicates that two different extents, e.g., two different volume files, were found to be using logical overlapping clusters, i.e., are using the same or a same portion of the volume's disk space.

In an embodiment a security descriptor corruption category 414 is included in the set of categories 460. In an embodiment a security descriptor corruption category 414 indicates that some type of corruption was noticed in the security descriptor stream. In an embodiment a security descriptor stream for a file on a volume 130 is a set of one or more security attributes, e.g., authorization access rules, associated with the file.

In an embodiment an invalid security identification, or id, category 416 is included in the set of categories 460. In an embodiment an invalid security id category 416 indicates that one or more file records were found to have non-zero security IDs that are not properly registered in a security ID index.

In an embodiment an index attribute corruption category 418 is included in the set of categories 460. In an embodiment file system 100 an index is one or more data structures that are utilized to improve the speed of data, i.e., object, retrievals from the file system volumes 130. In an embodiment an index attribute defines, or otherwise describes, an aspect of the file that the index supports. In an embodiment the index attribute corruption category 418 indicates that a corruption was found in an index attribute which may necessitate the deletion of all attributes related to the respective index.

In an embodiment an index entry corruption category 422 is included in the set of categories 460. In an embodiment an index contains the name of a file and points to the named file on a file system volume 130. In an embodiment the index entry corruption category 422 indicates that there is some type of corruption in the indicated index entry itself.

In an embodiment an index subtree corruption category 424 is included in the set of categories 460. In an embodiment an index subtree corruption category 424 indicates that a subtree index entry refers to a non-existent object.

In an embodiment an index offset corruption category 426 is included in the set of categories 460. In an embodiment an index offset corruption category 426 indicates that an index entry is corrupt. In an aspect of this embodiment an index offset corruption category 426 can further indicate that every subsequent index entry in the same index block is potentially corrupt.

In an embodiment an index order corruption category 428 is included in the set of categories 460. In an embodiment an index order corruption category 428 indicates that an index contains entries that are out of order.

In an embodiment an index connect corruption category 432 is included in the set of categories 460. In an embodiment the index connect corruption category 432 indicates that an index entry refers to a non-existent object, i.e., there appears to be a valid index entry yet it fails to refer to any object. In an embodiment an index connect corruption category 432 indicates that one or more objects ought to be inserted into an index, possibly as a result of, e.g., the recovery of a corrupted index.

In an embodiment a directory cycle corruption category 434 is included in the set of categories 460. In an embodiment file system 100 directories are used to associate files with their respective filenames. In an embodiment a directory cycle corruption category 434 indicates that a directory cycle was found in the file system namespace, i.e., there is an entry in a directory for a volume 130 that identifies an ancestor, i.e., parent, of the directory.

In an embodiment a cluster allocation corruption category 436 is included in the set of categories 460. In an embodiment a cluster allocation corruption category 436 indicates that clusters were found to be in use on the volume 130 but are marked as free, i.e., not in use, for the respective volume.

In an embodiment the format of a volume corruption record 400 is relatively compact in order to conserve space but it is also designed for ease of parsing so that the applications that work with its contents, e.g., an embodiment spot corruption verifier 120, can interpret the record's contents without requiring unnecessarily complicated deserialization operations. In an embodiment the format of a volume corruption record 400 is also flexible to accommodate, e.g., future extensions with minimal data and/or application redesign.

An embodiment volume corruption record 400 is of variable length, binary format. In an embodiment the fields of the volume corruption record 400 are encoded. In an aspect of this embodiment the fields of the volume corruption record 400 are encoded utilizing little endian byte ordering.

An embodiment volume corruption record 400 has a header field 410 which includes an instance tag that uniquely identifies the particular volume corruption record 400. In an embodiment the header field 410 of a volume corruption record 400 also includes the length, e.g., in bytes, of the volume corruption record 400.

An embodiment volume corruption record 400 includes a call stack identification field 430. In an embodiment the call stack identification field 430 contains a data structure entry that describes the kernel call stack at the point when the respective volume corruption was detected. In an embodiment the call stack identification field 430 contains a file id that uniquely identifies the source file that was executing when the respective volume corruption was detected. In an embodiment the call stack identification field 430 contains an identification of the source line number that was executing when the respective volume corruption was detected. In an embodiment the call stack identification field 430 contains a unique integer for identifying the location in the code base that was executing when the respective volume corruption was detected.

An embodiment volume corruption record 400 includes a binary sample corruption field 440. In an embodiment the binary sample corruption field 440 contains a data structure entry that has an arbitrary sample of binary data illustrative of the respective volume corruption.

Computing Device System Configuration

Figure 5:
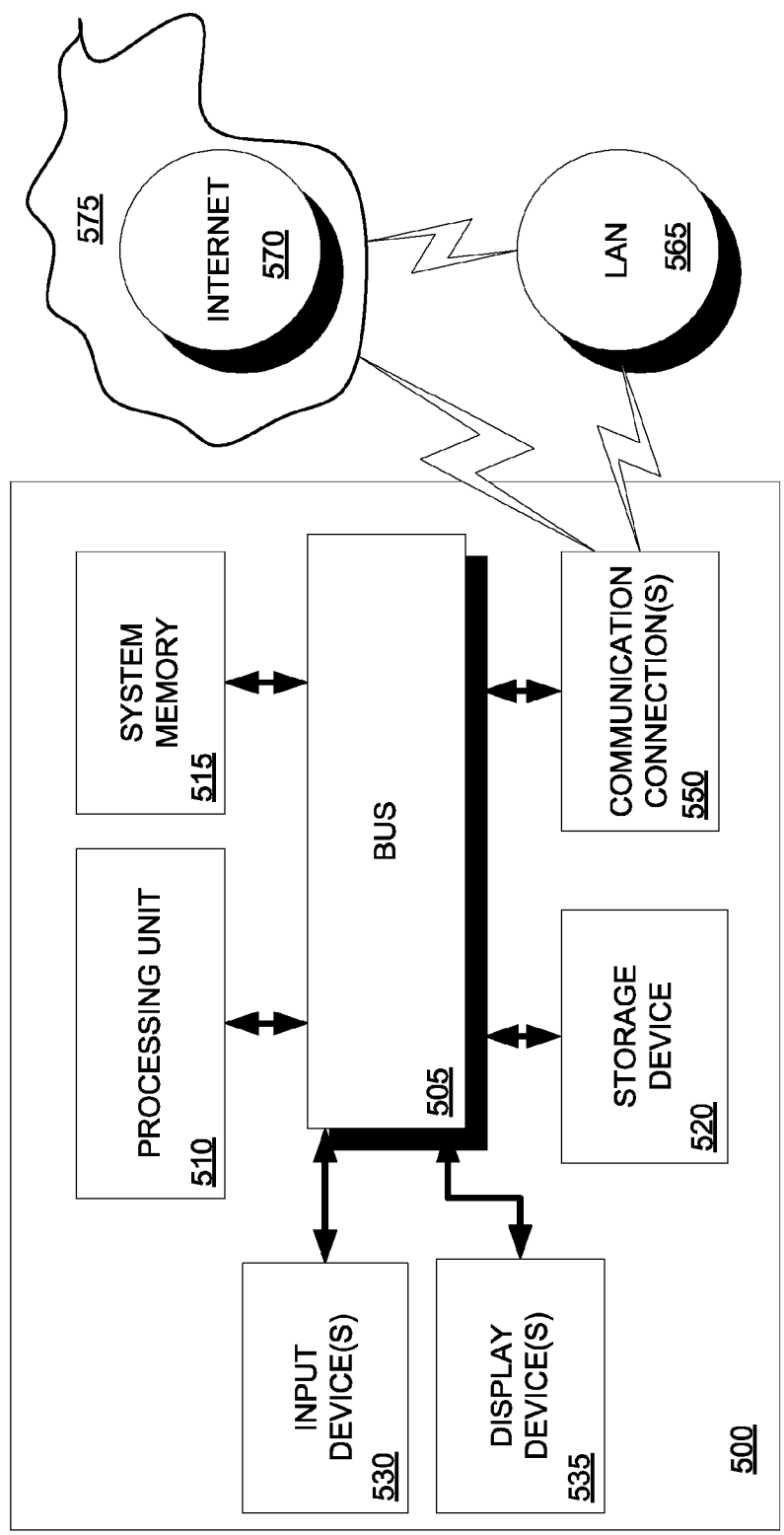
FIG. 5 is a block diagram of an exemplary basic computing device with the capability to process software, i.e., program code, or instructions.

FIG. 5 is a block diagram that illustrates an exemplary computing device system 500 upon which an embodiment can be implemented. Examples of computing device systems, or computing devices, 500 include, but are not limited to, servers, server systems, computers, e.g., desktop computers, computer laptops, also referred to herein as laptops, notebooks, etc.; etc.

The embodiment computing device system 500 includes a bus 505 or other mechanism for communicating information, and a processing unit 510, also referred to herein as a processor 510, coupled with the bus 505 for processing information. The computing device system 500 also includes system memory 515, which may be volatile or dynamic, such as random access memory (RAM), non-volatile or static, such as read-only memory (ROM) or flash memory, or some combination of the two. The system memory 515 is coupled to the bus 505 for storing information and instructions to be executed by the processing unit 510, and may also be used for storing temporary variables or other intermediate information during the execution of instructions by the processor 510. The system memory 515 often contains an operating system and one or more programs, or applications, and/or software code, and may also include program data.

In an embodiment a storage device 520, such as a magnetic or optical disk solid state drive, flash drive, etc., is also coupled to the bus 505 for storing information, including program code of instructions and/or data. In the embodiment computing device system 500 the storage device 520 is computer readable storage, or machine readable storage, 520.

Embodiment computing device systems 500 generally include one or more display devices 535, such as, but not limited to, a display screen, e.g., a cathode ray tube (CRT) or liquid crystal display (LCD), a printer, and one or more speakers, for providing information to a computing device user 180. Embodiment computing device systems 500 also generally include one or more input devices 530, such as, but not limited to, a keyboard, mouse, trackball, pen, voice input device(s), and touch input devices, which a user 180 can utilize to communicate information and command selections to the processor 510. All of these devices are known in the art and need not be discussed at length here.

The processor 510 executes one or more sequences of one or more programs, or applications, and/or software code instructions contained in the system memory 515. These instructions may be read into the system memory 515 from another computing device-readable medium, including, but not limited to, the storage device 520. In alternative embodiments, hard-wired circuitry may be used in place of or in combination with software instructions. Embodiment computing device system 500 environments are not limited to any specific combination of hardware circuitry and/or software.

The term "computing device-readable medium" as used herein refers to any medium that can participate in providing program, or application, and/or software instructions to the processor 510 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 515 and storage device 520 of embodiment computing device systems 500 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 500 also includes one or more communication connections 550 coupled to the bus 505. Embodiment communication connection(s) 550 provide a two-way data communication coupling from the computing device system 500 to other computing devices on a local area network (LAN) 565 and/or wide area network (WAN), including the world wide web, or internet, 570 and various other communication networks 575, e.g., SMS-based networks, telephone system networks, etc. Examples of the communication connection(s) 550 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 500 can include program, or application, and/or software instructions and data. Instructions received by the embodiment computing device system 500 may be executed by the processor 510 as they are received, and/or stored in the storage device 520 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for performing corruption processing for a file system, wherein the file system comprises at least one volume comprising at least one data structure, the method comprising:

identifying a potential corruption in a data structure in a volume of the file system;

generating an indication of the potential corruption;

generating a snapshot of the volume of the file system wherein the potential corruption has been identified;

processing with the snapshot of the volume of the file system wherein the potential corruption has been identified to attempt to verify the potential corruption, wherein the processing is performed while the volume of the file system wherein the potential corruption has been identified is maintained online;

determining that the potential corruption is a false positive when the processing fails to verify the potential corruption; and determining that the potential corruption is a verified corruption when the processing succeeds in verifying the potential corruption.

2. The method for corruption processing of claim 1, further comprising:

generating a snapshot of the indication of the potential corruption; and utilizing the snapshot of the indication of the potential corruption in processing to attempt to verify the potential corruption.

3. The method for corruption processing of claim 2, wherein the indication of the potential corruption is a verification entry that is generated and stored and wherein the verification entry identifies the potential corruption.

4. The method for corruption processing of claim 3, further comprising storing the generated verification entry in an error verification log for the volume of the file system wherein the potential corruption has been identified.

5. The method for corruption processing of claim 4, further comprising:
   generating a snapshot of the error verification log for the volume of the file system wherein the potential corruption has been identified;
   utilizing the generated snapshot of the error verification log for the volume of the file system wherein the potential corruption has been identified in the processing to attempt to verify the potential corruption;
   rendering the verification entry in the error verification log for the volume of the file system wherein the potential corruption has been identified irrelevant following a determination verifying that the potential corruption is corrupt; and
   generating an indication of the verifying.

6. The method for corruption processing of claim 5, wherein the indication comprises a corruption entry that is generated and stored in an error correction log for the volume of the file system wherein the verified corruption has been identified, and wherein the corruption entry identifies the verified corruption.

7. The method for corruption processing of claim 5, wherein rendering the verification entry in the error verification log for the volume of the file system wherein the potential corruption has been identified irrelevant comprises deleting the verification entry in the error verification log for the volume of the file system wherein the potential corruption has been identified.

8. The method for corruption processing of claim 4, further comprising:
   generating a snapshot of the error verification log for the volume of the file system wherein the potential corruption has been identified;
   utilizing the generated snapshot of the error verification log for the volume of the file system wherein the potential corruption has been identified in the processing to attempt to verify the potential corruption; and
   rendering the verification entry in the error verification log for the volume of the file system wherein the potential corruption has been identified irrelevant following a determination that the potential corruption is a false positive.

9. The method for corruption processing of claim 1, further comprising:
   categorizing the potential corruption identified in a data structure in a volume of the file system wherein a category that is assigned to the potential corruption comprises one of a group of a predetermined number of corruption categories; and
   utilizing the category that is assigned to the potential corruption in the attempt to verify the potential corruption.

10. The method for corruption processing of claim 9, further comprising
    generating an indication of the verified corruption, wherein the indication of the verified corruption is a corruption entry that is generated and stored in an error correction log for the volume of the file system wherein the verified corruption has been identified, and wherein the corruption entry identifies the verified corruption; and
    utilizing the categorization of the verified corruption to generate information that is included in the corruption entry that is generated and stored in the error correction log for the volume of the file system wherein the verified corruption has been identified.

11. The method for corruption processing of claim 1, further comprising:
    generating an indication of each potential corruption that is identified in any volume of the file system; and
    processing each indication of each potential corruption this has been identified in any volume of the file system to attempt to verify each potential corruption that has been identified, wherein the processing of each indication of each potential corruption that has been identified in any volume of the file system is performed while each volume of the file system remains online and accessible.

12. The method for file system corruption processing of claim 1, further comprising categorizing the potential corruption in a data structure in a volume of the file system at the time the potential corruption is identified, and wherein generating a snapshot of the volume of the file system wherein the potential corruption has been identified is initiated to occur upon the generation of the indication of the potential corruption.

13. A computing device comprising:
    storage storing a file system that supports file system corruption spot verification, the file system comprising:
        at least one volume, wherein the at least one volume comprises at least one data structure;
        a file system manager for managing the file system; and
        a spot corruption verifier for attempting to verify identified corruptions in the at least one volume, wherein an identified corruption comprises a potential corruption identified in a volume of the file system, and wherein the spot corruption verifier attempts to verify identified corruptions while the at least one volume remains online and the at least one data structure remains accessible.

14. The computing device of claim 13, wherein the file system manager activates the spot corruption verifier after a corruption is identified on a volume of the file system and wherein the spot corruption verifier, when activated, processes to attempt to verify identified corruptions that were identified prior to the activation of the spot corruption verifier.

15. The computing device of claim 14, further comprising an error verification log for each volume of the file system, wherein a verification entry is generated for an error verification log when an identified corruption is identified in a data structure in the error verification log's volume.

16. The computing device system of claim 15, wherein the spot corruption verifier, following activation, generates a snapshot of a volume whose error verification log has at least one verification entry when the spot corruption verifier is activated.

17. The computing device of claim 15, further comprising an error correction log for each volume of the file system, wherein a corruption entry is generated for an error correction log following the processing of an identified corruption by the spot corruption verifier wherein the processing results in the verification of the identified corruption.

18. A method for corruption verification, wherein a file system comprises at least one volume, and wherein each volume of the file system comprises at least one data structure, the method comprising:
    performing processing for each volume of the file system that has at least one potential corruption previously identified thereon, wherein the processing comprises verifying identified potential corruptions that comprise existing corruptions, and further comprises identifying false positive corruptions that comprise identified potential corruptions that are not existing corruptions, wherein this processing of each volume of the file system that has at least one potential corruption previously identified thereon is performed while each volume of the file system is maintained online;

generating a snapshot of each volume of the file system that has at least one potential corruption previously identified thereon, wherein the performed processing for each volume of the file system that has at least one potential corruption previously identified thereon comprises utilizing the snapshot of a corresponding volume of the file system to verify identified potential corruptions thereon and further utilizing the snapshot of the volume of the file system to identify false positive corruptions thereon; and providing no notification to a user of the file system of any potential corruption that, upon processing, is identified as a false positive corruption.

19. The method for corruption verification of claim 18, wherein the processing for a given volume of the file system that has at least one potential corruption previously identified thereon is performed subsequent to the identification of a corruption on the volume of the file system.

20. The method for corruption verification of claim 18, wherein each volume of the file system has a first log for storing entries that identify potential corruptions on a volume and a second log for storing entries that identify verified corruptions on the volume, further comprising:

generating a snapshot of the first log for a volume of the file system that has at least one potential corruption previously identified thereon for use in verifying identified potential corruptions on the volume and for use in identifying false positive corruptions on the volume;

rendering an entry in the first log for the volume of the file system that has at least one potential corruption previously identified thereon irrelevant after verifying the potential corruption identified by the entry in the first log;

generating an entry in the second log for the volume of the file system that has at least one potential corruption previously identified thereon after verifying a potential corruption thereon; and rendering an entry in the first log for the volume of the file system that has at least one potential corruption previously identified thereon irrelevant after identifying the potential corruption identified by the entry in the first log as a false positive corruption.

* * * * *